United States Patent [19]

Elrod

[11] Patent Number: 4,933,838
[45] Date of Patent: Jun. 12, 1990

[54] SEGMENTABLE PARALLEL BUS FOR MULTIPROCESSOR COMPUTER SYSTEMS

[75] Inventor: Steven E. Elrod, Auburn, Wash.

[73] Assignee: The Boeing Company, Seattle, Wash.

[21] Appl. No.: 56,988

[22] Filed: Jun. 3, 1987

[51] Int. Cl.[5] .................... G06F 15/16; G06F 11/20; G06F 13/40

[52] U.S. Cl. .................... 364/200; 371/9.1; 364/228.3; 364/229; 364/229.2; 364/268; 364/268.3; 364/268.9

[58] Field of Search ... 364/200 MS File, 900 MS File; 371/8, 9, 11, 9.1

[56] References Cited

U.S. PATENT DOCUMENTS

| | | | |
|---|---|---|---|
| 3,984,819 | 10/1976 | Anderson | 364/200 |
| 4,234,919 | 11/1980 | Bruce et al. | 364/200 |
| 4,296,469 | 10/1981 | Gunter et al. | 364/200 |
| 4,342,083 | 7/1982 | Freedman et al. | 364/200 |
| 4,356,546 | 10/1982 | Whiteside et al. | 364/200 |
| 4,385,350 | 5/1983 | Hansen et al. | 364/200 |
| 4,415,973 | 11/1983 | Evans | 364/200 |
| 4,456,956 | 6/1984 | El-Gohary et al. | 364/200 |
| 4,468,738 | 8/1984 | Hansen et al. | 364/200 |
| 4,488,217 | 12/1984 | Binder et al. | 364/200 |
| 4,490,788 | 12/1984 | Rasmussen | 364/200 |
| 4,495,573 | 1/1985 | Ballegeer et al. | 364/200 |
| 4,524,428 | 6/1985 | Grinberg et al. | 364/900 |
| 4,535,192 | 1/1986 | Ceccon et al. | 364/200 |
| 4,622,633 | 11/1986 | Ceccon et al. | 364/200 |
| 4,627,055 | 12/1986 | Mori et al. | 371/11 |
| 4,634,110 | 1/1987 | Julich et al. | 371/11 |
| 4,709,365 | 11/1987 | Beale et al. | 371/11 |
| 4,713,811 | 12/1987 | Frey et al. | 371/11 X |
| 4,719,622 | 1/1988 | Whipple et al. | 364/200 |
| 4,722,084 | 1/1988 | Morton | 364/200 |

OTHER PUBLICATIONS

Mead et al, *Introduction to VLSI Systems*, Second Printing, Addison-Wesley Publishing Company, Oct. 1980, pp. 82–90.

*Primary Examiner*—Raulfe B. Zache
*Attorney, Agent, or Firm*—Foley & Lardner, Schwartz, Jeffery, Schwaab, Mack, Blumenthal & Evans

[57] ABSTRACT

A multiprocessor system includes a segmentable parallel bus for dividing the multiprocessor system into several independent groups of processors. Each group of processors can access its segment of the segmentable parallel bus to carry on processing within the group simultaneously and independently of processing occurring in another group of processors on another segment of the segmentable bus. The multiprocessor system of this invention further has the capability to reconfigure the segments and processors associated therewith in order to cope with a failed processor or bus segment.

14 Claims, 7 Drawing Sheets

FIG. 6

OVERLORD SEGMENTED BUS STATE TABLE

ENGINEERING TECHNOLOGY

| # | State |
|---|---|
| 0 | ADDRESS FROM RIGHT |
| 1 | ADDRESS FROM LEFT |
| 2 | ADDRESS FROM ME |
| 3 | READ FROM RIGHT TO LEFT |
| 4 | READ FROM RIGHT TO ME |
| 5 | WRITE FROM RIGHT TO LEFT |
| 6 | WRITE FROM RIGHT TO ME |
| 7 | READ FROM LEFT TO RIGHT |
| 8 | READ FROM LEFT TO ME |
| 9 | WRITE FROM LEFT TO RIGHT |
| 10 | WRITE FROM LEFT TO ME |
| 11 | READ FROM ME TO RIGHT |
| 12 | READ FROM ME TO LEFT |
| 13 | READ FROM ME TO ME |
| 14 | WRITE FROM ME TO RIGHT |
| 15 | WRITE FROM ME TO LEFT |
| 16 | WRITE FROM ME TO ME |
| 31 | BUS ERROR |

4,933,838

SEGMENTABLE PARALLEL BUS FOR MULTIPROCESSOR COMPUTER SYSTEMS

BACKGROUND OF THE INVENTION

The U.S. Government has rights in this invention pursuant to Contract No. F19628-80-C-0083 awarded by the U.S. Air Force.

This invention relates generally to data processing systems, and in particular to a multiprocessor system having a segmented bus.

In prior art multiprocessor systems, individual processing modules communicate with each other over a series of parallel global busses. As shown in FIG. 1, a prior art multiprocessor system 100 includes a series of processing modules that communicate with each other over either global bus 1 or global bus 2. Busses 1 and 2 are nominally 32-bit line busses. Of course, several more global busses may be provided. At any one instant in time, communication can only occur between two processors on each global bus. For example, if modules 10 and 13 were communicating over global bus 1, modules 11 and 12 could only simultaneously communicate with each other over global bus 2. Assuming that the task being performed by modules 10 and 13 is one that frequently occurs, this leaves only global bus 2 for communication between the remaining modules. This leads to a reduction in the speed of processing of the overall system.

Of course, one solution to the above problem is to provide additional parallel global busses. However, this requires additional hardware which increases the overall cost of the multiprocessor system. Furthermore, if such a multiprocessor system is to be expanded for additional processors, each of the global busses must be extended to these additional processors, thereby increasing the cost of system expansion.

An additional drawback of the prior art multiprocessor systems utilizing a series of parallel global busses is that if a bus failure occurs, the entire global bus is useless to the system. This will not only reduce the speed of the multiprocessor, multibus system, but will also entail an extensive and costly repair.

A still further drawback of the aforementioned prior art multiprocessor systems arises in the area of system bandwidth. For example, assuming each global bus 1 and 2 has a bandwidth of 10 megawords per second (mwps), the total system bandwidth is 20 mwps. Thus, if the overall system bandwidth is to be increased, an additional global bus is required resulting in a costly system expansion. Alternatively, if no additional global buses could be provided and if all of the parallel buses, such as 1 and 2, were globally accessible, bus bandwidth would become a bottleneck as processors were added to the system.

SUMMARY OF THE INVENTION

Accordingly, it is an object of the present invention to provide a multiprocessor system capable of simultaneously and independently performing several tasks with a minimum of global busses.

A further object of the present invention is to provide a multiprocessor system that is equipped with a fault tolerance mechanism for handling either processor faults or bus faults.

A still further object of the present invention is to provide a multiprocessor system that is capable of achieving a simplified system expansion.

Yet another object of the present invention is to provide a multiprocessor system that is free of system bandwidth limitations as processors are added to the system.

Other objects and advantages of this invention will become more apparent hereinafter in the specification and drawings.

In accordance with one aspect of the invention, a data processing system comprises a plurality of units and a data transmission channel for permitting communication among the plurality of units in a sequential fashion, and apparatus for dividing the data transmission channel into a plurality of segments, each segment being capable of transmitting data independent of and simultaneously with at least one other segment.

In another aspect of the present invention, the data processing system further includes a plurality of spare units associated with the data transmission channel in the sequential fashion and apparatus for reconfiguring the plurality of segments to include at least one of the spare units and one of the segments.

Applicant's invention is a data processing system which comprises a plurality of processing units, at least a first and a second bus segment, the first bus segment connected to a first plurality of the processing units and the second bus segment connected to a second, different plurality of said processing units. At least two processing units in the first plurality of processing units are in data communication with each other over the first bus segment, and at least two processing units in the second plurality of processing units are in data communication with each other over the second segment. The first and second bus segments are electrically isolated from one another. The invention further includes apparatus for reconfiguring the first and second bus segments for connection to at least one of a different first and second plurality of processing units.

Applicant's invention may also be seen to include a method of data processing comprising the steps of: (a) connecting a first plurality of processing units to one another in series by means of a first bus segment, (b) connecting a second plurality of processing units to one another in series by means of a second bus segment electrically isolated from the first bus segment, (c) providing a plurality of spare processing units, (d) performing a first task using the first plurality of processing units, the first task involving the step of transferring data between the first plurality of processing units, (e) simultaneously with step (d) performing a second task using the second plurality of processing units, the second task involving the step of transferring data between the second plurality of processing units, the first task and second task being independent of one another, (f) detecting a fault in a processing unit of the first plurality of processing units, (g) disconnecting the faulty processing unit from accessing the first bus segment, (h) reconfiguring the first plurality of processing units to include an additional processing unit taken from the second plurality of processing units, and (i) reconfiguring the second plurality of processing units to exclude the additional processing unit and to include one of the spare processing units.

BRIEF DESCRIPTION OF THE DRAWINGS

FIG. 6 is a state table for the module state machine;

DETAILED DESCRIPTION OF THE PREFERRED EMBODIMENT

Figure 1:
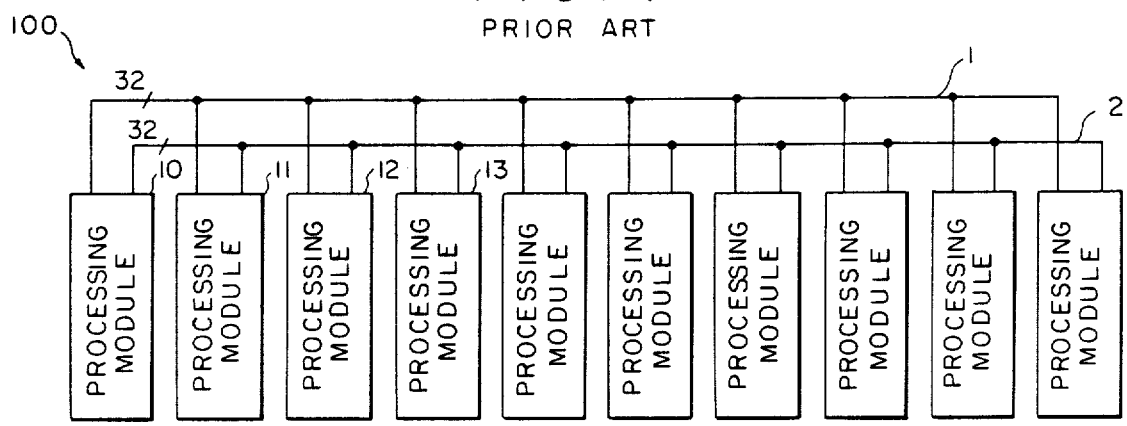
FIG. 1 is a schematic representation of a prior art multiprocessor system.
Figure 2:
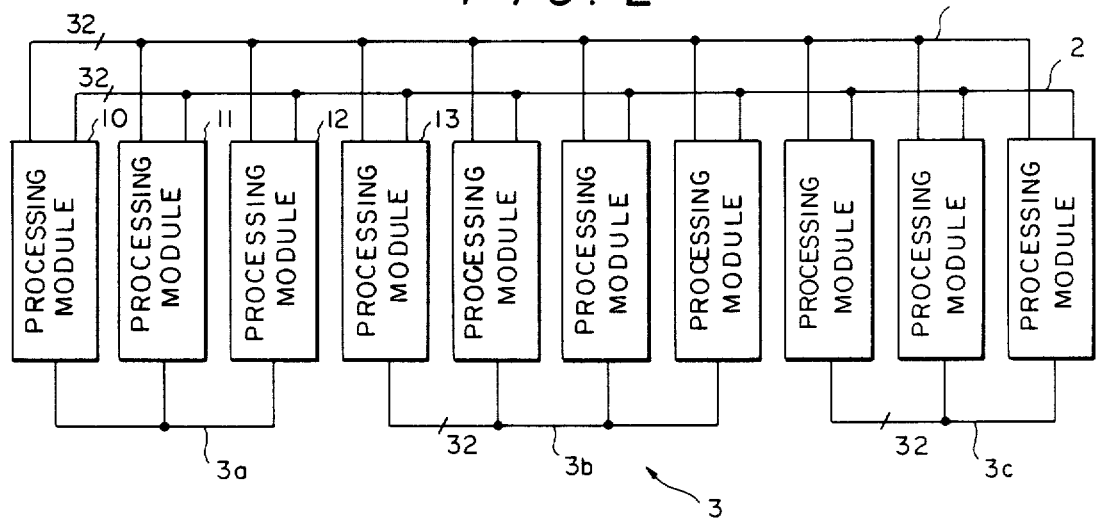
FIG. 2 is a schematic representation showing the concept of the segmented parallel bus for a multiprocessor system according to the present invention.

Referring now more particularly to a preferred embodiment of the invention, FIG. 2 shows conceptually a multiprocessor system having a segmented bus according to the present invention. Like elements will bear the same reference numerals as in FIG. 1. As shown in FIG. 2, a third or segmented bus 3 is provided that can be divided into three segments 3a, 3b and 3c. Thus, communication can occur between modules associated with segment 3a while simultaneous and independent communication can occur between modules associated with other segments 3b and 3c.

Figure 3:
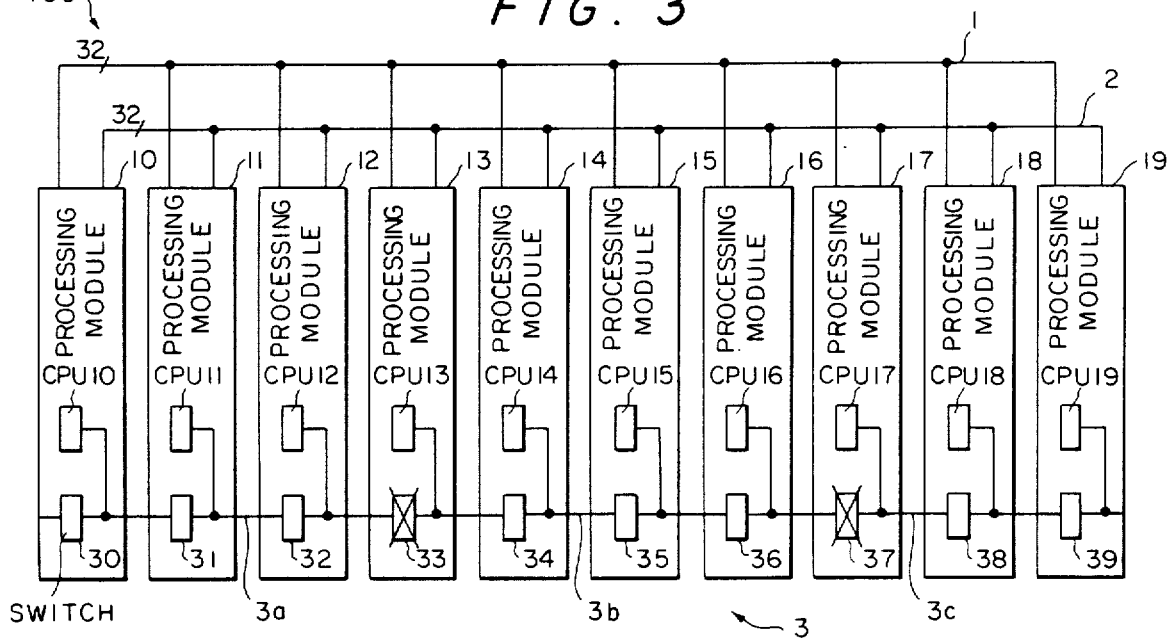
FIG. 3 is a schematic representation of the realization of the segmented parallel bus according to the present invention.

More particularly, FIG. 3 shows the realization of a segmented parallel bus 3 according to the present invention. The segmented bus 3 must be capable of electrically isolating several parts of the bus from each other. While this may be done with relays or semiconductor equivalents, the use of three-state devices 30, 31, . . . in a sequential method of address and data passing will be described by way of example only. These three-state devices may typically be a Texas Instruments Octal Bus Transceiver having three-state outputs (part number SN74LS245). In order to provide a sequential method of address and data passing, each module 10, 11, . . . on the bus 3 must have separate connections to its left and right neighbors and must be capable of passing data in either direction. If the module is designated as a segment end, such as modules 13 and 17, the module must also be able to place its three-state device in the high impedance state so that it will not affect the data on the neighboring segment. This situation is represented by the "X" placed over the three-state devices 33 and 37. The elements CPU10-CPU19 correspond to the central processing units within each of the processing modules 10-19 respectively.

Figure 4:
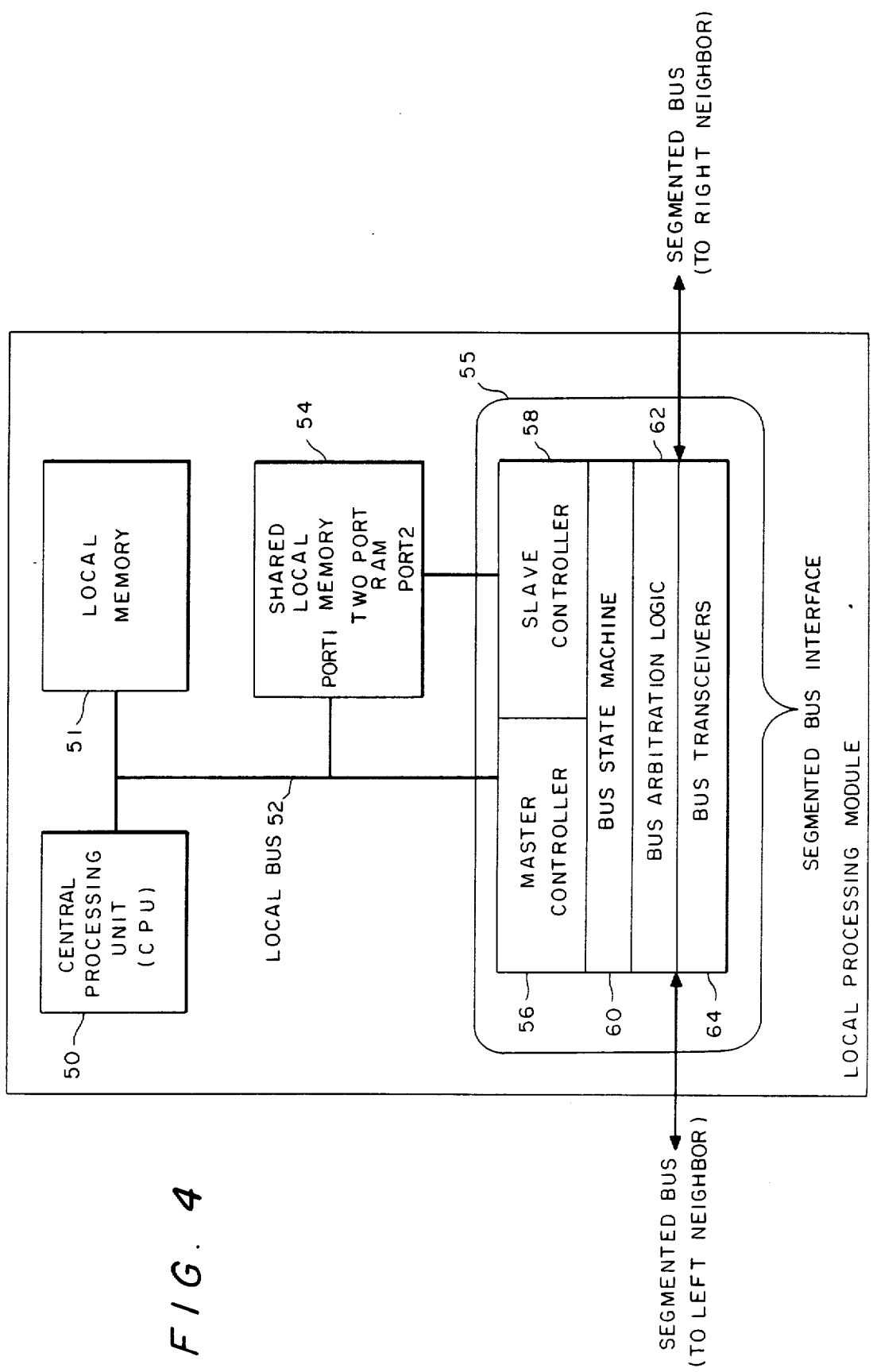
FIG. 4 is a schematic representation of an individual processing module interfacing with the signals transmitted on a segment of the segmented parallel bus according to the present invention.
Figure 5:
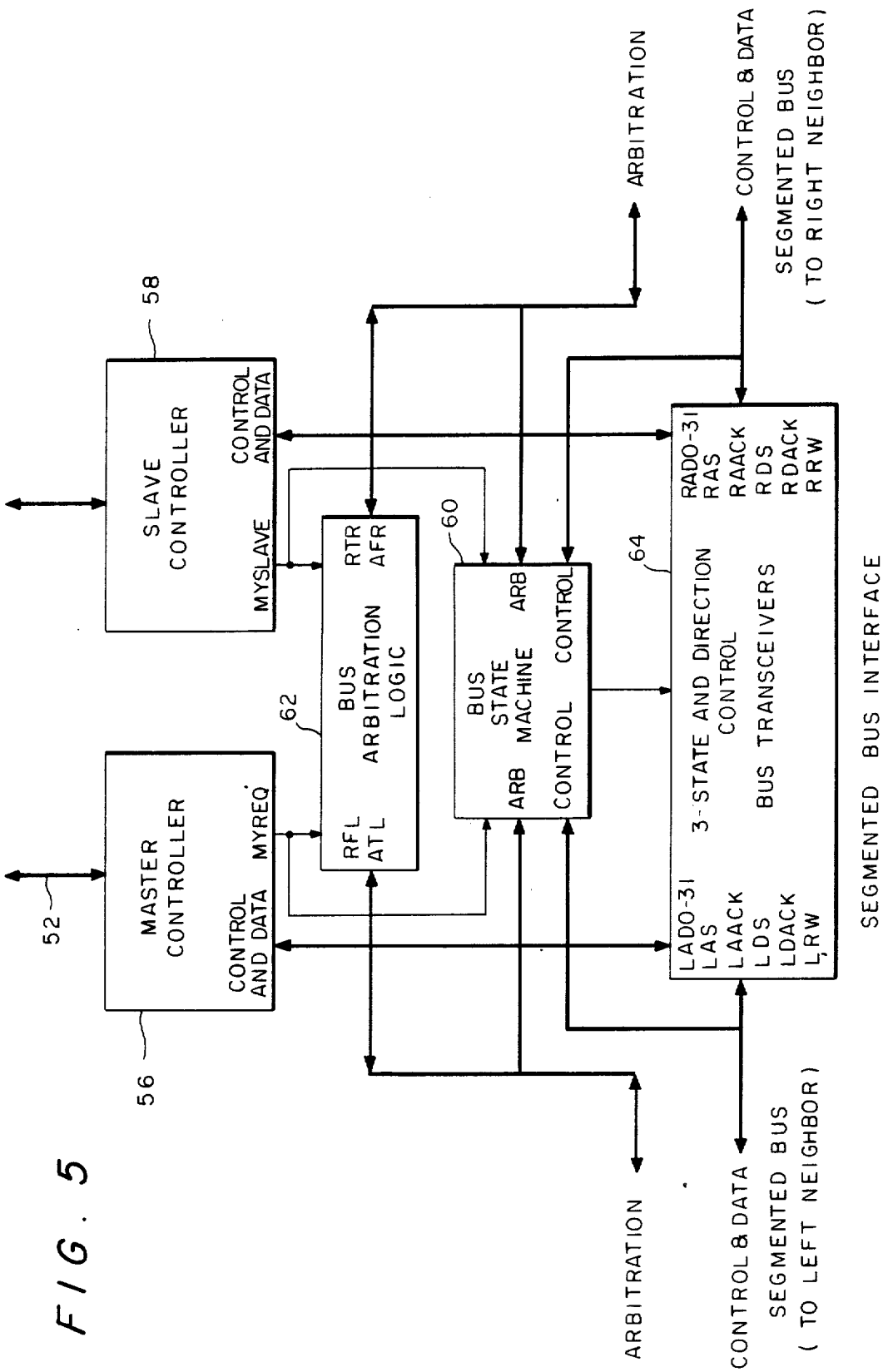
FIG. 5 is a schematic diagram of the segmented bus interface of FIG. 4.

Implementation of the segmented bus calls for 32 address/data lines from/to the left neighbor and 32 address/data lines from/to the right neighbor. These data lines and various other signals to be described are shown interfacing with an individual processing module in FIG. 4. FIG. 4 illustrates a processing module which may be either master or slave and is seen to comprise a local processor designated CPU 50, local memory 51, local address/data bus 52, and shared local memory or two port RAM 54. The local memory 51 is accessible by the local processor CPU 50 whereas the shared local memory 54 (two port RAM) is accessible by both the local processor CPU 50 or other local processors via a segmented bus interface 55. The segmented bus interface 55 is shown in FIGS. 4 and 5 and is seen to comprise a master controller 56, slave controller 58, bus state machine 60, bus arbitration logic 62, and bus transceiver 64 (equivalent to a switch member such as the three state device 30 of FIG. 3). Each module is able to request a transfer over the segment bus to which it is connected via its master controller 56. Requests received from other modules are handled by the slave controller 58 which has direct access to one port of the two-port RAM 54. In this manner, reads and writes can take place over the bus segment without any effect on the module CPU.

Each module is capable of running in two modes, connected to left (CTL) or not connected to left (~CTL). In the CTL Mode, the processor has higher priority devices connected to its left. In ~CTL mode, the processor is the leftmost and the highest priority processor on its segment. Note that this scheme calls for priorities to be assigned by physical location, higher priorities to the left. This is done to simplify the bus and therefore reduce the pin count on the bus.

In addition to the 32 address/data lines to the left (LAD0-31) and the 32 address/data lines to the right (RAD0-31), the bus requires arbitration and control signals. The arbitration signals are generated by the bus arbitration logic 62 and include Request from Left (RFL), Request to Right (RTR), Acknowledge to Left (ATL), and Acknowledge from Right (AFR). The control signals include Right Read/Write (RRW), Left Read/Write (LRW), Right Address Strobe (RAS), Left Address Strobe (LAS), Right Address Acknowledge (RAACK), and Left Address Acknowledge (LAACK). Right Data Strobe (RDS), Left Data Strobe (LDS), Right Data Acknowledge (RDACK), and Left Data Acknowledge (LDACK) complete the control signals passed on the segmented bus. The control signals may be seen to correspond to the usual address and data protocol signals found, for example, on the Motorola 68000 microprocessor, and reference may be had to the 68000 User's Manual, incorporated herein by reference, for further details. These conventional control signals are passed/received to the left or right in accordance with the state of the bus state machine 60 and bus arbitration logic and thereafter identified with an "L" or "R" prefix accordingly. These signals are summarized below in Table I.

TABLE I

| Connected to Processor on Left Mode | |
| --- | --- |
| No. of Pins | |
| 32 | LAD0-31 Left Address/Data 0-31 (bidirectional) |
| 1 | RFL Request from Left |
| 1 | ATL Acknowledge to Left |
| 1 | LRW Left Read/Write (bidirectional) |
| 1 | LAS Left Address Strobe (bidirectional) |
| 1 | LAACK Left Address Acknowledge (bidirectional) |
| 1 | LDS Left Data Strobe (bidirectional) |
| 1 | LDACK Left Data Acknowledge (bidirectional) |
| Connected to Processor on Right Mode | |
| No. of Pins | |
| 32 | RAD0-31 Right Address/Data 0-31 (bidirectional) |
| 1 | RTR Request to Right |
| 1 | AFR Acknowledge from Right |
| 1 | RRW Right Read/Write (bidirectional) |
| 1 | RAS Right Address Strobe (bidirectional) |

TABLE I-continued

| | |
|---|---|
| 1 | RAACK Right Address Acknowledge (bidirectional) |
| 1 | RDS Right Data Strobe (bidirectional) |
| 1 | RDACK Right Data Acknowledge (bidirectional) |

MYREQ and MYSLAVE signals are generated by the master controller 56 and slave controller 58 respectively. MYREQ becomes active when the CPU 50 wants to use the segmented bus. MYSLAVE is a signal that indicates that a reference over the segmented bus is intended for shared local memory 54. It indicates that some other processing module would like to read or write data in the shared local memory 54. Thus, the segmented bus interface 55 has three interface functions: (1) Interface to Module on the Left = > LAD0-31, RFL, ATL, LRW, LAS, LAACK, LDS, and LDACK; (2) Interface to Module on the Right = - > RAD031, RTR, AFR, RRW, RAS, RAACK, RDS, and RDACK; and (3) Interface to Local Processing Module = > MYREQ and MYSLAVE.

The purpose of the Master Controller is to detect when the local processor (CPU 50) is attempting to read or write over the segmented bus and to generate control signals which must be routed to the segmented bus by the bus transceivers 64. Thus, the master controller 56 acts as an interface (or gateway) between the local bus 52 and the segmented bus. If the local bus 52 requests a read or write from a remote memory (for example, the memory of another processing module) over the segmented bus, the master controller 56 generates the proper signals at the proper times to transmit the information on the segmented bus. In the case of a write, the address on the local bus 52 is placed on the segmented bus data lines (RAD0-31 and LAD0-31), and RAS and LAS are sent out. After the appropriate acknowledge, the data on the local bus is routed onto the segmented bus. The master controller 56 takes signals on the local bus 52 and produces the signals with correct timing for the segmented bus. These signals are routed onto the correct segmented bus signals by the bus transceivers 64 as controlled by the bus state machine 60. Thus, the master controller 56 generates the signals, but doesn't know or care where they are sent. The bus transceivers 64 don't know or care how the signals are generated, but route them to the appropriate place depending on the current state of the bus.

The master controller 56 generates AS (which can be routed to RAS and/or LAS), DS (which can be routed to or from RDS and/or LDS), and RW (which can be routed to RRW and/or LRW). It receives (from the bus transceivers 64) AACK (which is generated by RAACK or LAACK) and DACK (which is generated by RDACK or LDACK). It sends and receives data over AD31-0 (which may be sent over RAD0-31 and- /or LAD0-31 and received from RAD0-31 or LAD0- 31).

The purpose of the slave controller 58 is to monitor the segmented bus for accesses to local shared memory (i.e., RAM 54). It does this by comparing addresses on the segmented bus to valid local memory addresses. When an access to local memory is received, the slave controller 58 will issue an AACK to acknowledge that address. The slave controller 58 will pass that address to local shared memory. On a write, the slave controller 58 will receive a data strobe (DS) to clock the data into memory. The slave controller 58 will issue DACK when the data has been properly stored in memory. On a read, the slave controller 58 will receive a DS to signal that data should be placed on the AD0-31 bus. The slave controller 58 sets DACK when valid data has been placed on the bus. It holds it until DS becomes inactive. The slave controller 58 receives RW and uses it to determine whether the current bus cycle is a read or write.

As with the master controller 56, the slave controller 58 is not concerned with how signals are routed to and from the segmented bus. The slave controller 58 merely generates and receives signals that are routed through the bus transceiver 64. The bus transceiver 64 uses the bus state information from bus state machine 60 to determine how signals are routed between the slave controller and the two sides of the segmented bus.

As shown in FIG. 5, the bus arbitration logic 62 passes the four signals: (1) RFL, (2) RTR, (3) AFR, and (4) ATL to the bus state machine 60. No signals are passed from the bus state machine 60 to the bus arbitration logic 62.

The bus state machine 60 can determine the state of the bus using these four signals along with: (1) RAS, (2) LAS, (3) RAACK, (4) LAACK, (5) RDS, (6) LDS, (7) RDACK, (8) LDACK, (9) RRW, (10) LRW, and the signals (11) MYREQ from the master controller 56 and (12) MYSLAVE from the slave controller 58.

The bus arbitration logic 62 receives the MYREQ signal from the master controller 56 and receives the MYSLAVE signal from the slave controller 58. It also receives RFL, ATL, RTR, and AFR from the segmented bus. The correct direction to drive all bus transceivers 64 is determined by using only the current state of the bus.

In operation, if a processor, for example, module 14 in FIG. 3, termed the requesting processor, desires bus access, it will assert RTR. The processor which is the requesting processor's nearest neighbor on the right, i.e., module 15, will see this signal on its RFL line. The nearest neighbor on the right will in turn assert its own RTR signal which propagates until the RTR signal reaches the rightmost processor, i.e., module 16, in the segment. In general, RTR from any local module will be active if Request from Left (RFL) is active or if the Local CPU 50 is requesting the bus (MYREQ).

At this point, the right-most processor (module 16) will in turn assert RTR, and its right neighbor, i.e., module 17, (which is in the ~CTL mode) will issue an ATL (in fact, it may issue ATL continuously). The rightmost processor (module 16) will receive the ATL signal as an AFR signal and will then issue ATL to its left neighbor. The ATL signal will propagate to the left until it reaches the requesting processor, module 14. The requesting processor will then check to make sure no higher priority devices, i.e., module 13, are requesting the bus, i.e., check to see that RFL is not asserted, and, if not, will issue an address on the segment. At this point, the requesting processor (module 14) is the master of the bus segment.

If Module 13 desires the bus, it requests it from Module 14. Module 13 will not receive an acknowledge until Module 14 is finished. Module 13 knows that the bus master is located somewhere to its right (it may be module 14, 15, 16, ...). It knows this because Module 13 has not received an Acknowledge from Right (AFR). The current bus master is always the right-most Module which has an active AFR and an inactive ATL. All modules which do not have an active AFR correctly assume that the bus master is somewhere to their right.

The three-state transceivers 30, 31, . . . are bidirectional transceivers which control the direction of transmission of address and data information. Each processor module determines whether the bus master is to its left or right based on the state of the arbitration signals.

Each processor module then transmits addresses away from the master during the address cycle. During data writes, the processor modules transmit data away from the master. During the data cycle, however, the modules determine where data is originating and set up their transceivers accordingly. This information can be obtained by monitoring the RAACK and LAACK lines. When a processor sees its address on the bus during an address cycle (a different address is assigned to each module), it issues an address acknowledge toward the master (all modules will drive these lines toward the master). Any module that receives an acknowledge from its left will drive its data transceivers toward the master for the data cycle (for a read).

While the same procedure is true for acknowledge from right also, it is impossible to have both AFR and AFL active at the same time. It is only legitimate to have one module respond to (acknowledge) an address on the bus since every address is assigned to a unique module.

Those modules which do not receive an address acknowledge will place their drivers, i.e., tri-state transceivers, in the high impedance state.

An example of the signal protocol is as follows:
(1) Processor requiring bus issues RTR.
(2) Processor eventually receives AFR.
(3) If RFL is not asserted, processor is master of the bus.
(4) During a write operation, master sets RRW or LRW to write. During a read operation, master sets RRW or LRW to read.
(5) Master issues address on RAD0-31 and LAD0-31.
(6) Master issues RAS and LAS.
(7) Master receives either RAACK or LAACK depending on which direction the addressed processor is from the master
(8) Master releases RAD0-31, LAD0-31, RAS and LAS.
(9) During a write operation,
 (a) Master issues data on RAD0-31 or LAD0-31 as appropriate.
 (b) Master issues RDS or LDS as appropriate.
 (c) Master receives RDACK or LDACK as appropriate from addressed processor, i.e., slave.
 (d) Master releases RAD0-31, LAD0-31, RDS and LDS.
(10) During a read operation,
 (a) Slave issues data on RAD0-31 or LAD0-31 as appropriate.
 (b) Master issues RDS or LDS as appropriate.
 (c) Master receives RDACK or LDACK as appropriate from slave.
 (d) Master releases RDS and LDS.
 (e) Slave releases RAD0-31 and LAD0-31.
(11) If RFL is not active, master releases RTR.
(12) If RFL is active, master issues ATL thereby passing control onto a processor to the left.

Thus, the state of a module's transceiver depends on (1) whether the module is in CTL or ~CTL mode, (2) whether the master is to the module's left or right as determined by the state of the AFR and ATL signals, (3) whether the bus is currently in an address cycle or a data cycle as determined by RAS, LAS, RDS, and LDS, (4) whether the data cycle is a read or a write as determined by the state of RRW and LRW, and (5) the location of the slave processor as determined by whether RAACK or LAACK was active during the address cycle.

Module control of a particular segment of the segmented bus can be implemented in accordance with the protocol set forth above through the bus state machine 60 for each module, which controls the direction of the three-state transceiver 64. Control of the bus segment can be implemented through the state machine 60 which controls the direction of the transceivers 64. The master and slave functions of the controllers 56 and 58 are essentially independent, and each use the current state of the bus to determine whether or not they are involved in the current bus transaction. The particular design of the state machine is not important to the segmented parallel bus of the present invention. Indeed, several designs are possible and may be easily developed according to the techniques taught by Conway and Mead in *Introduction to VLSI Systems*, the whole of which is incorporated herein by reference.

The bus state machine 60 updates the state of the module by combining the current state of the module with the arbitration logic signals. In turn, the master controller 56 and slave controller 58 react to the updated state of the module depending upon whether or not and how the module is involved in the current bus transaction. For instance, the master controller 56 requests a bus transaction by asserting MYREQ (the equivalent of a bus request BR signal for the 68000 processor). The bus arbitration logic 62 in response to the MYREQ signal, requests the segmented bus as described above. When this request has been granted, (corresponding to a bus grant BG signal on the 68000 microprocessor, for example) the bus state machine 60 will indicate that control has been granted. Conversely, the slave controller monitors the segmented bus waiting for a request for access to the module's memory, i.e., memory 54. Monitoring can be achieved by assigning specific addresses to each module's memory. When a request is received, the slave controller informs the bus state machine 60 by asserting MYSLAVE. Data is then either read from or written to the addressed two-port RAM 54. The two-port RAM 54 may be any commercially available two-port RAM device such as the IDT7132 CMOS Dual Port RAM manufactured by Integrated Device Technology, Inc. The two-port RAM 54 is provided for local access by the module's CPU and for remote access by another module's CPU via the segmented bus interface 55. However, a one-port RAM may also be used if the port is connected to the segmented bus. In this situation, both local and remote access would occur over the segmented bus.

A possible state table for the state machine 60 is illustrated in FIG. 6. Moreover, FIG. 7 sets forth a timing diagram for a write operation to a module to the right of the requesting module (master) with the signals shown being those present at the master.

Figure 7:
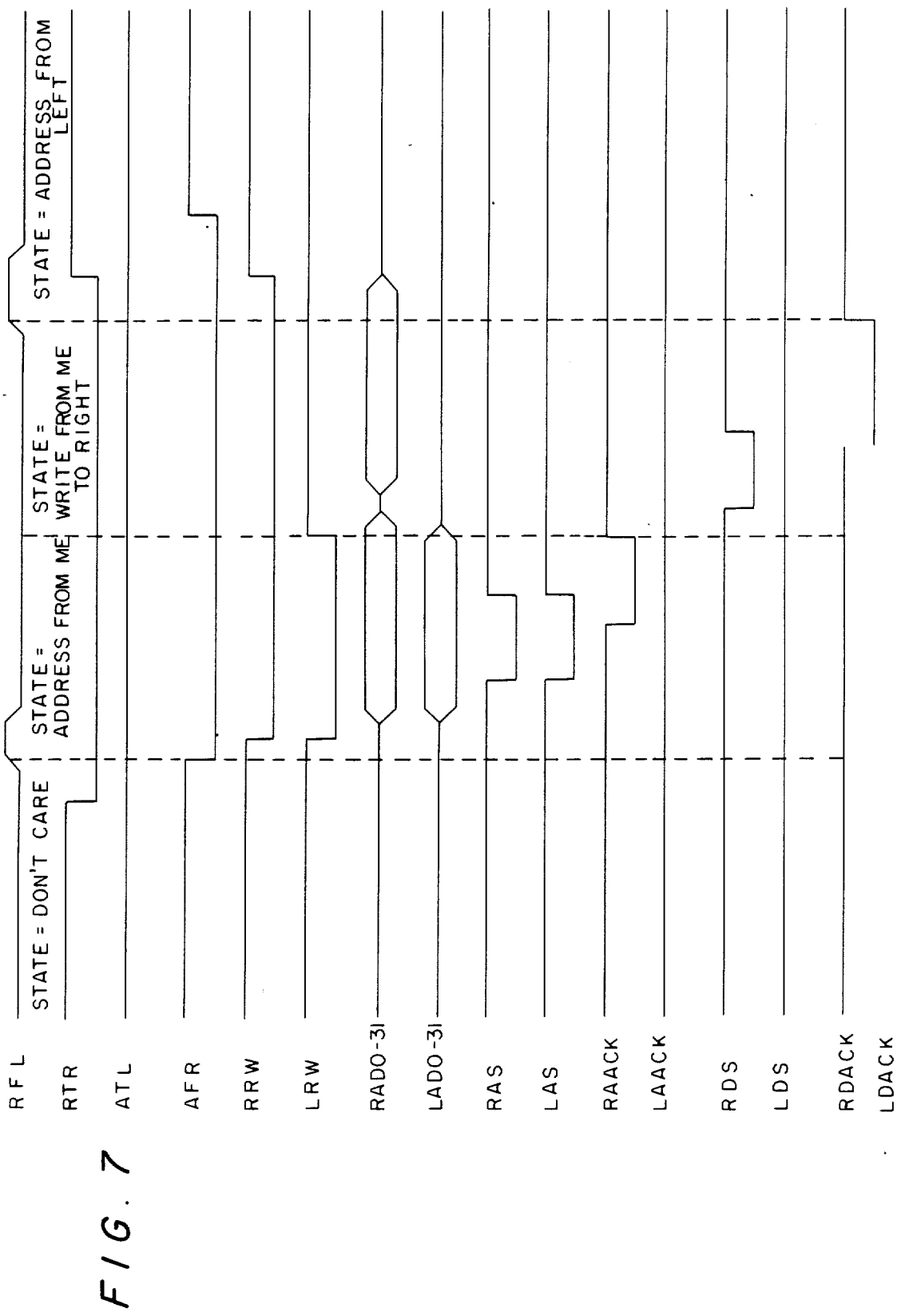
FIG. 7 is a timing diagram for a write operation.

The timing diagram of FIG. 7 shows how the segmented bus signals vary with time (with time increasing to the right on the diagram) during a bus write cycle where the slave processor happens to be to the right of the Bus Master. The timing diagram shows typical signals at the interface between a local processing module and its neighbors. The exact timing depends on the position of the Master and Slave for the current bus cycle. FIG. 7 illustrates the following features (1) the Local Module activates RTR to request the bus. This is in response to MYREQ (not shown).

BUS STATE=>DON'T CARE, but assume ADDRESS FROM RIGHT (2) The Local Module receives RFR to acknowledge bus mastership. (This is true only if RFL is not active—if it is, bus mastership must be passed to the left.)

BUS STATE=>ADDRESS FROM ME (3) Local Module sets RRW and LRW low to indicate a Write Cycle.

BUS STATE=>ADDRESS FROM ME (4) Local Module places address on RAD0-31 and LAD0-31, since it doesn't know which direction to the slave.

BUS STATE=>ADDRESS FROM ME (5) Local Module issues RAS and LAS to signify that valid addresses are on the bus.

BUS STATE=>ADDRESS FROM ME (6) Local Module receives RAACK indicating that desired slave is on the right.

BUS STATE=>ADDRESS FROM ME (7) Local Module releases RAS since acknowledge has been received.

BUS STATE=>ADDRESS FROM ME (8) Slave Module releases RAACK.

BUS STATE=>WRITE FROM ME TO RIGHT (9) Local Module places Data on RAD0-31.

BUS STATE=>WRITE FROM ME TO RIGHT

(10) Local Module issues RDS to indicate that valid data is on the bus.

BUS STATE=>WRITE FROM ME TO RIGHT

(11) Local Module receives RDACK indicating that the data has been received by the Slave Module.

BUS STATE=>WRITE FROM ME TO RIGHT

(12) Local Module releases RDS.

BUS STATE=>WRITE FROM ME TO RIGHT

(13) Slave Module release RDACK.

BUS STATE=>WRITE FROM ME TO RIGHT

(14) Local Module removes Data from RAD0-31.

BUS STATE=>WRITE FROM ME TO RIGHT

(15) Local Module releases RRW signal.

BUS STATE=>WRITE FROM ME TO RIGHT

(16) Local Module releases RTR (if RFL is not active)

BUS STATE=>WRITE FROM ME TO RIGHT

(17) Right Neighbor Module releases AFR.

BUS STATE=>ADDRESS FROM RIGHT (stays in this state looking for RAS or a change in arbitration signals)

FAULT TOLERANCE

An important feature of the segmented bus is that it allows segment size to be changed when a faulty processor is found and a spare processor must be switched onto that segment. Another feature is that bus faults can be isolated and switched out of the system so that none of the segments are affected by the fault.

Figure 8:
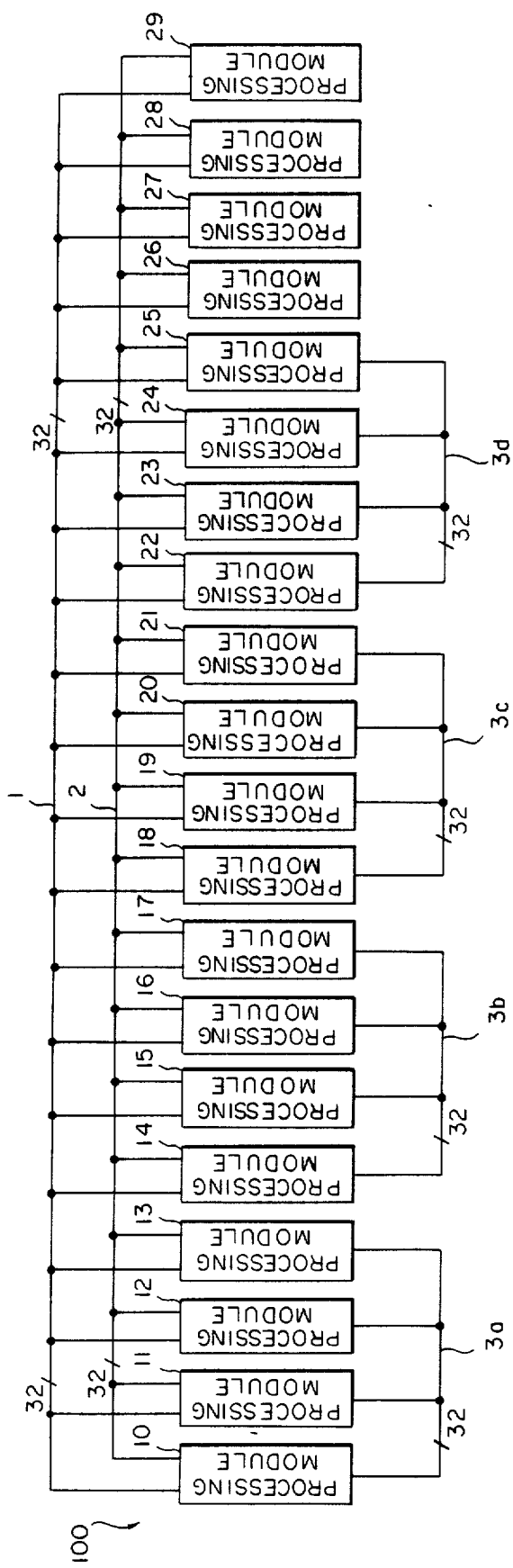
FIG. 8 is a schematic representation showing the fault tolerance aspect of the segmented parallel bus according to the present invention.

One possible scenario of fault tolerance is described hereinbelow with reference to FIG. 8. Assume the system 100 is programmed with four tasks, each of which takes four processors. In addition, four spare processors are added to the system as hot spares. Thus, the entire system 100 contains twenty processors, numbered 10 through 29 from left to right. Processors 10-13 are assigned to the first task and share segment 3a on the bus. Note that the conceptual embodiment of the invention, similar to that shown in FIG. 2, is used for ease of description. The actual series connection of FIG. 3 would, however, be used in practice. Similarly, processors 14-17 share segment 3b; processors 18-21 share segment 3c; and processors 22-25 will share segment 3d. Processors 26-29 are spares and are not be connected to any segment.

Figure 9:
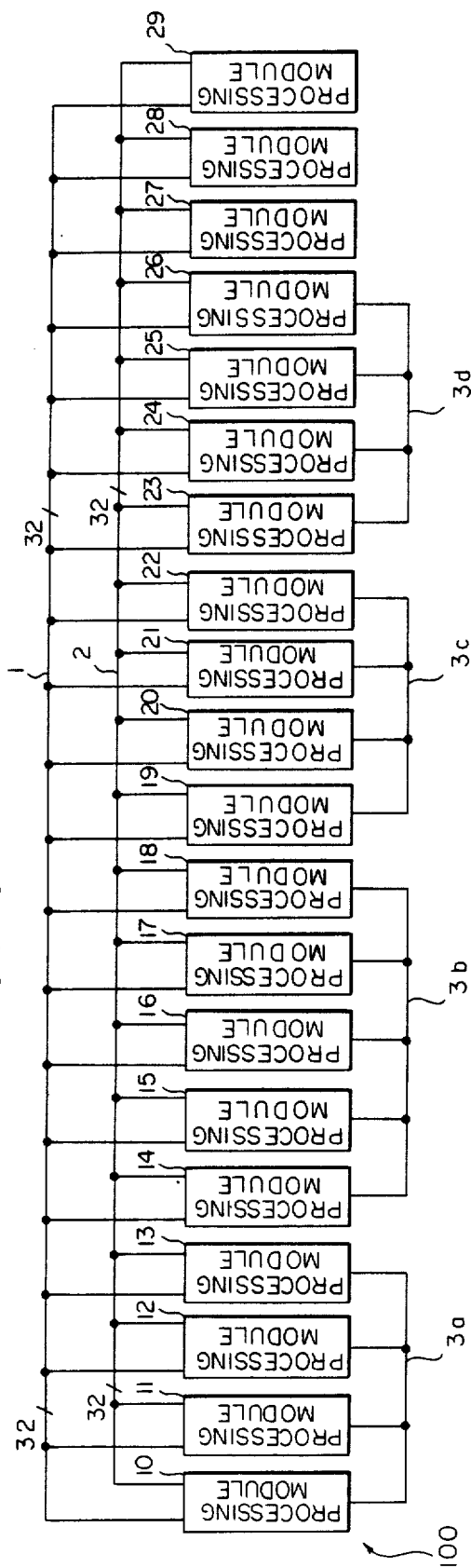
FIG. 9 is a schematic representation of the reconfiguration of FIG. 8 after a fault has been detected.

Suppose now that processor 15 fails. The system is then reconfigured to replace that processor with one that is functioning. Only processors which are physically next to each other can share the same segment, and thus tasks are reassigned to the processors with the adjacent processor configuration as a governing constraint. After reconfiguration, processors 10-13 still share segment 3a and work on the first task. Processors 14, 16, 17 and 18 share segment 3b and work on the second task; processors 19-22 share segment 3c; processors 23-26 share segment 3d; and processors 27-29 are spare. This reconfigured state is illustrated in FIG. 9. Note that processor 15 is still connected to segment 3b, since it is necessary to pass address and data information between its two neighbors. However, the processing module is not able to place any signals on the segment bus emanating from its own state machine since the signals MYREQ and MYSLAVE are inhibited.

Thus, the fault tolerance scheme firstly requires fault detection and, secondly, requires reconfiguration after fault detection. Fault detection can be achieved in any one of a number of ways and a particular type of fault detection is not critical to the segmented parallel bus. It is sufficient to say that a fault is detected by any processing unit in the system when communication fails.

One of the key advantages of the segmented bus multiprocessor system is its ability to reconfigure itself after a fault or, alternatively, to satisfy the task requirements of the overall system. For purposes of description and by way of example, one method of reconfiguration following a processor failure will be discussed. For example, hardware relays may be provided at each processing module that could be software-set to make it impossible for the failed module to be connected to its neighbor(s). This setting may, for example, be conditioned upon receipt of a software signal originating from two other processors that have had failed communications with the failed processor. This software signal, termed a disable signal, may then be used to disable the modules MYREQ and/or MYSLAVE, thereby preventing the failed processor from accessing the segmented bus.

Figure 10:
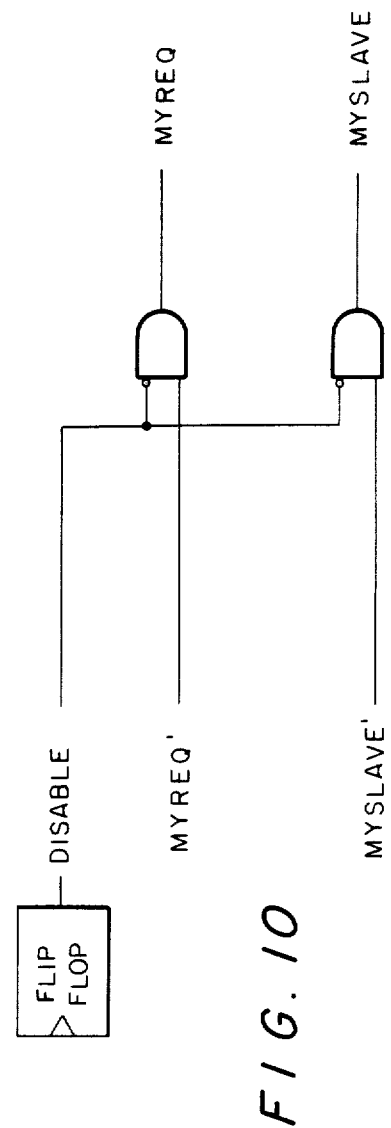
FIG. 10 is a schematic diagram of a logic inhibit circuit used to inhibit operation of a faulty module.

The MYREQ signal and the MYSLAVe signal can be disabled, for example, by using simple TTL 'AND' gates in which the output is always inactive if the disable signal is active and follows the other input if the disable signal is inactive as illustrated in FIG. 10. In this figure, MYREQ' and MYSLAVE' are signals generated by the master and slave controllers of the failed processor CPU. The segmented bus interface 55 will perform properly as long as MYREQ and MYSLAVE are prevented from becoming active.

It is important to note, however, that even though the failed processor is prevented from accessing the segmented bus, control signals, arbitration signals and data are free to pass along the segmented bus at the failed processor.

An example of a second, and more serious, type of failure is one where processor 15 fails in such a way that it causes a failure on the segmented bus. Processor 15 is thus unable to pass address and data information between its two neighbors on the segment 3b and so processors 14 and 16 cannot communicate over segment 3b. (For example, the bus transceivers may become inoperative or some control circuitry may fail.)

This is a more serious failure than before and calls for a different reconfiguration. In this case, processors 10-13 still work on the first task and share segment 3a. Now, however, processors 16-19 are assigned to the second task on segment 3b. Processors 20-23 share segment 3c and processors 24-27 share segment 3d. Processors 28 and 29 are spares. Note that this failure causes two spares to be used and leaves processor 14 unusable, even though it has no faults. This scenario would be even worse if the bus on processor 17 failed. In this case, processors 14, 15, and 16 are unusable since a block of four processors is required to perform a task, but this still leaves spares 28 and 29 to cover that scenario. This failure mode is considered rare and represents the worst failure on the bus. Note, however, that a bus failure on a global bus would have even more serious consequences, as the entire bus is unusable for every processor. Thus, the segmented bus allows the fault to be isolated and its effects minimized.

Once reconfiguration of the segments has taken place, it is necessary to load the programs of the failed processor module(s) into the reconfigured or spare modules. Of course, this might be avoided by providing each module with every possible program. Practically, however, it is better to provide all of the possible programs in a memory of a host computer (not shown) and load the required programs from the host to the reconfigured or spare modules.

SYSTEM BANDWIDTH

The advantages of the present invention further reside in its ability to provide a multiprocessor system that has a readily expandable total bus bandwidth. For example, assume a multiprocessor system has a global bus with a bandwidth of 10 megawords per second (mwps) and a segmentable bus configured as a second global bus also with a bandwidth of 10 mwps. In this situation, the total system bandwidth would be 20 mwps.

If, however, the segmented bus is divided into two segments, the system bandwidth improves to 30 mwps. If the segmented bus is divided into three segments, the system bandwidth improves to 40 mwps. Of course, communication between two processors not on the same segment cannot occur over the segmented bus, but most communication will probably be between two processors working on a particular software task. Communication between tasks will occur over the global bus. Thus, the segmented bus allows for growth in the system. If all of the parallel busses were globally accessible, bus bandwidth would become a bottleneck as processors were added to the system. However, the segmented bus allows a far larger number of processors to be added to the system before bandwidth becomes a problem.

TIMING

All signals on the segmented bus must be propagated in a sequential fashion through each module's transceiver in a daisy-chain fashion on the local segment. This naturally leads to a bus which will become slower as more modules are added to a segment. The segment bandwidth will also depend on (1) the distance between the master and the slave during a transfer since the acknowledge signals from the slave will end the address and data cycles, and (2) the distance from the next master to the current master since the RTR and AFR signals must propagate to that point. The overall bandwidth is therefore difficult to characterize, but it can be said that the speed will be greater when a small number of processors share a segment. The minimum bandwidth of the segmented bus, however, can be characterized since it depends only on the number of processors on the segment. A sample calculation is provided giving a worst case scenario.

(1) For the bus arbitration cycle, the maximum time = 2 * (propagation delay) * (number of processors). (RTR from leftmost to rightmost and ATL from rightmost to leftmost.)

(2) For the address cycle, the maximum time = 2 * (propagation delay) * (number of processors) + address setup. (RAS from leftmost to rightmost and LAACK from rightmost to leftmost.)

(3) For the data cycle, the maximum time = 2 * (propagation delay) * (number of processors) + data setup. (RDS from leftmost to rightmost and LDACK from rightmost to leftmost.)

(4) Thus, for the total bus cycle time, the maximum time = 6 * (propagation delay) * (number of processors) + address setup + data setup.

Now, assuming propagation delay = 10 ns, address setup = 20 ns, and data setup = 100 ns, for 4 processors, the maximum time = 6 * 10 * 4 + 20 + 100 = 360 ns, resulting in a bandwidth = 1/360 ns = 2.7 Mhz.

For 256 processors, the maximum time = 6 * 10 * 256 + 20 + 100 15,480 ns bandwidth = 1/15,480 ns = 64.6 Khz = 0.065 Mhz.

Note that this calculation is the worst case. Normal operation is expected to be considerably better than this.

The segmentable parallel bus is a parallel communication bus designed to be implemented in a multiprocessor computer system. This bus differs from conventional parallel busses because it can be divided into segments, each of which can simultaneously pass data. One segmentable bus can be configured to act like any number of independent parallel busses. Each of these segments connects a group of adjacent processors which may be dynamically added to or removed from either end of the segment.

The arrangement that has been described is ideally suited for problems in which a group of processors work on a task and pass the results on to another group of processors. In this situation, the first group of processors could be on one segment and the second group could be on a second segment. When the first group finishes processing its data, the two segments can temporarily be joined to form one large segment. The data could then be transferred from the first group to the second group and the bus could again be divided into two segments.

The advantages of the present invention are numerous. The segmented busses are designed to operate in a real-time computing environment. While it was not designed to be the only communication bus in the system, it could operate in that mode. Most importantly though, the segmented parallel bus is designed to alleviate most of the traffic on a global bus. Since most of the data in real-time systems is passed over predefined paths, it is often the case that only a few of the many potential communication paths of a traditional parallel bus are utilized. Thus, communication bottlenecks can be reduced by grouping those processors on the most heavily used paths onto the same segment. They can then communicate without affecting the communication capabilities of other processors. While traditional parallel busses can become overloaded by the communication between two processors, the segmentable parallel bus effectively increases the system bus bandwidth by a factor equal to the number of segments on the bus.

Thus, although the invention has been described relative to specific embodiments thereof, it is not so limited, and numerous variations and modifications thereof will be readily apparent to those skilled in the art in light of the above teaching. For example, while the description has only made reference to processing modules, it is to be understood that other units might also be connected as part of a segment such as input/output units. It is therefore to be understood that within the scope of the appended claims, the invention may be practiced otherwise than as specifically described.

What is claimed is:

1. A method of data processing comprising the steps of:
    (a) connecting a first plurality of processing units to one another in series by means of a first bus segment,
    (b) connecting a second plurality of processing units to one another in series by means of a second bus segment electrically isolated from said first bus segment,
    (c) providing a plurality of spare processing units,
    (d) connecting each of said first and second plurality of processing units and said spare plurality of processing unit to one another by means of a global transmission bus,
    (e) performing a first task using said first plurality of processing units, said first task involving the step of transferring data between said first plurality of processing units,
    (f) simultaneously with step (e), performing a second task using said second plurality of processing units, said second task involving the step of transferring data between said second plurality of processing units, said first and second tasks being independent of one another,
    (g) detecting a faulty processing unit of said first plurality of processing units,
    (h) disconnecting said faulty processing unit from accessing said first bus segment,
    (i) by means of said global transmission bus, reconfiguring said first plurality of processing units to include an additional processing unit taken from said second plurality of processing units, and
    (j) by means of said global transmission bus, reconfiguring said second plurality of processing units to exclude said additional processing unit and to include one of said spare processing units.

2. A method of data processing as recited in claim 1 wherein each of said processing units includes a memory storing a program and an ALU and wherein said step of reconfiguring in steps (i) and (j) include the step of:
    upon detection of said fault in step (g), loading the memory of a spare processing unit with the same program as stored in the memory of the faulty processing unit via a host processor.

3. A method of data processing as recited in claim 1 wherein the step (e) includes the steps of:
    (1) transmitting a Request to Right (RTR) signal from a requesting processing unit to an adjacent processing unit, said RTR signal serving as a bus request signal,
    (2) transmitting another RTR signal from said adjacent processing unit to the next adjacent processing unit, and so forth, until the last processing unit within said first plurality of processing units receives said RTR signal,
    (3) generating an Acknowledge to Left (ATL) signal in said last processing unit and transmitting same in series, leftwardly, from said last processing unit toward said requesting processing unit, and
    (4) upon receipt of said ATL signal by said requesting processing unit, ascertaining in said requesting processing unit if any processing unit to the left of said requesting processing unit has requested the bus segment, and if not, granting said requesting processing unit access to said bus segment.

4. A method of data processing comprising the steps of:
    (a) connecting a first plurality of processing units to one another in series by means of a first bus segment,
    (b) connecting a second plurality of processing units to one another in series by means of a second bus segment electrically isolated from said first bus segment,
    (c) providing a plurality of spare processing units,
    (d) connecting each of said first and second plurality of processing units and said spare plurality of processing unit to one another by means of a global transmission bus,
    (e) performing a first task using said first plurality of processing units, said first task involving the step of transferring data between said first plurality of processing units,
    (f) simultaneously with step (e), performing a second task using said second plurality of processing units, said second task involving the step of transferring data between said second plurality of processing units, said first and second tasks being independent of one another,
    (g) detecting a faulty processing unit in said second plurality of processing units,
    (h) disconnecting said faulty processing unit from accessing said second bus segment, and
    (i) by means of said global transmission bus reconfiguring said second plurality of processing units to exclude said faulty processing unit and to include at least one of said spare processing units.

5. A data processing system comprising:
    (a) a first and second, different pluralities of processing units, all of which are connected together in series via a single series bus, said bus having a first and second bus segment,
    (b) each processing unit of said first plurality of processing units connected in series to one another via said first bus segment, and each processing unit of said second plurality of processing unit connected in series with one another via said second bus segment,
    (c) at least two processing units in said first plurality of processing units in data communication with each other over said first bus segment,
    (d) at least two processing units in said second plurality of processing units in data communication with each other over said second bus segment,
    (e) switch means operable in a first state for electrically isolating said first and second bus segments from one another and operable in a second state for electrically connecting said first and second bus segments together, (f) a communication bus connected to each processing unit of said first and second plurality of processing units, said communication bus distinct from said first and second bus segments, and (g) means for selectively implementing said switch means in anyone of said first and second pluralities of processing units so as to selectively define said first and second bus segments along said bus.

6. A data processing system as recited in claim 5 further comprising a plurality of spare processing units all of which are connected together in series via a third bus segment, and a spare switch means operable in a first state for electrically isolating said plurality of spare processing units from said bus and operable in a second state for electrically connecting said third bus segment to an end processing unit of one of said first or second bus segments.

7. A data processing system as recited in claim 5 wherein each processing unit of said plurality of processing units has a central processing unit and a memory and further includes a circuit means for inhibiting access of its central processing unit and memory to said bus so as to electrically remove a faulty processing unit from said data processing system, said circuit means further permitting passage of data through said faulty processing unit between adjacent left and right processing units of said faulty processing unit.

8. A data processing system as recited in claim 7 further including means for utilizing one of said spare processing units to replace said faulty processing unit.

9. A data processing system comprising:

(a) a plurality of processing modules each including an associated processing unit and an interface, (b) a single segmentable bus connected in series to each interface of each of said plurality of processing modules, (c) a left end processing module of said plurality of processing modules having its interface connected to the interface of a single processing module to its right over said segmentable bus, (d) a right end processing module of said plurality of processing modules having its interface connected to the interface of a single processing module to its left over said segmentable bus, (e) middle processing modules connected in series between said left and right end processing modules, each middle processing module connected to only two adjacent processing modules over said segmentable bus, one of said two adjacent processing modules being a right neighbor processing module and another of said two adjacent processing modules being a left neighbor processing module, (f) each interface of said middle processing modules including (1) an associated controller for switchably connecting and disconnecting its associated processing unit to said segmentable bus, (2) an associated right neighbor segmentable bus connecting means, and (3) an associated left neighbor segmentable bus connecting means, (g) each right neighbor segmentable bus connecting means of said middle processing modules operable in a first state for connecting its associated interface to the interface of its immediately adjacent right neighbor processing module over said segmentable bus and operable in a second state for isolating its associated interface from the interface of its adjacent right neighbor processing module, (h) each left neighbor segmentable bus connecting means of said middle processing modules operable in a first state for connecting its associated interface to the interface of its adjacent left neighbor processing module over said segmentable bus and operable in a second state for isolating its associated interface from the interface of its adjacent left neighbor processing module, (i) said interface of said left end processing module having an associated controller for switchably connecting and disconnecting its associated processing unit to said segmentable bus and an associated right neighbor segmentable bus connecting means, said right neighbor segmentable bus connecting means operable in a first state for connecting its associated interface to the interface of its adjacent right neighbor processing module over said segmentable bus and operable in a second state for isolating its associated interface from the interface of its adjacent right neighbor processing module, (j) said interface of said right end processing module having an associated controller for switchably connecting and disconnecting its associated processing unit to said segmentable bus and an associated left neighbor segmentable bus connecting means, said left neighbor segmentable bus connecting means operable in a first state for connecting its associated interface to the interface of its adjacent left neighbor processing module over said segmentable bus and operable in a second state for isolating its associated interface from the interface of its adjacent left neighbor processing module, (k) means for configuring said system in a two segment bus configuration by one of:

(1) operating said right neighbor segmentable bus connecting means of any given middle processing module in said first state and operating said left neighbor segmentable bus connecting means of said given middle processing module in said second state and further operating all other right neighbor segmentable bus connecting means and left neighbor segmentable bus connecting means of all other processing modules in said first state, whereby said given processing module and all processing modules to the right of said given processing module are connected together in a first bus segment, and all processing modules to the left of said given processing module are connected together in a second bus segment, said first bus segment electrically isolated from said second bus segment, and (2) operating said right neighbor segmentable bus connecting means of any given middle processing module in said second state and operating said left neighbor segmentable bus connecting means of said given middle processing module in said first state and further operating all other right neighbor segmentable bus connecting means and left neighbor segmentable bus connecting means of all other processing modules in said first state, whereby said given processing module and all processing modules to the left of said given processing module are connected together in said second bus segment, and all processing modules to the right of said given processing module are connected together in said first bus segment, said first segment electrically isolated from said second bus segment, and
(1) a communication bus connected to each of said plurality of processing modules, said communication bus distinct from said segmentable bus.

10. A data processing system as recited in claim 9 wherein said processing modules which are connected in said first bus segment are in data communication with each over said first bus segment and wherein said processing modules which are connected in said second bus segment are in data communication with each other over said second bus segment.

11. A data processing system as recited in claim 9 wherein each controller is operative for connecting its associated processing unit to said segmentable bus.

12. A data processing system as recited in claim 9 further including a plurality of spare processing modules each spare processing module including an associated processing unit and interface and each interface of each spare processing module including an associated controller and left neighbor segmentable bus connecting means and right neighbor segmentable bus connecting means, said spare processing modules connected in series with one another over a third bus segment, and end spare processing module of said third bus segment connected to one of said right end or left end processing modules.

13. A method of operating the data processing system as recited in claim 9 comprising the steps of:
(a) selecting an additional given middle processing module, and
(b) operating said right neighbor segmentable bus connecting means and left neighbor segmentable bus connecting means of said additional given middle processing module to define a third bus segment electrically isolated from said first and second bus segments.

14. A method of operating the data processing system as recited in claim 46 comprising the steps of:
(a) detecting a faulty processing module among said plurality of processing modules,
(b) operating the controller of said faulty processing module so as to switchably disconnect the processing unit of said faulty processing module from said segmentable bus,
(c) operating said right neighbor segmentable bus connecting means and left neighbor segmentable bus connecting means of said faulty processing module in said first state so that data may pass through said interface of said faulty processing module between the adjacent left neighbor and right neighbor processing modules of said faulty processing module, and
(d) increasing the number of processing modules in the bus segment containing said faulty processing module by adding one of said plurality of spare processing modules thereto, said processing module added by operating the left neighbor segmentable bus connecting means or right neighbor segmentable bus connecting means of said end processing module connected to said third bus segment in its first state and operating the left neighbor segmentable bus connecting means or right neighbor segmentable bus connecting means of said added spare processing module to its second state thereby incorporating said added spare processing module into the bus segment of said faulty processing module to replace said faulty processing module.

* * * * *